May 28, 1957   F. R. McNEILL ET AL   2,793,484
ROTARY DISC MOWER CUTTER MOUNTING MEANS
Filed March 9, 1954
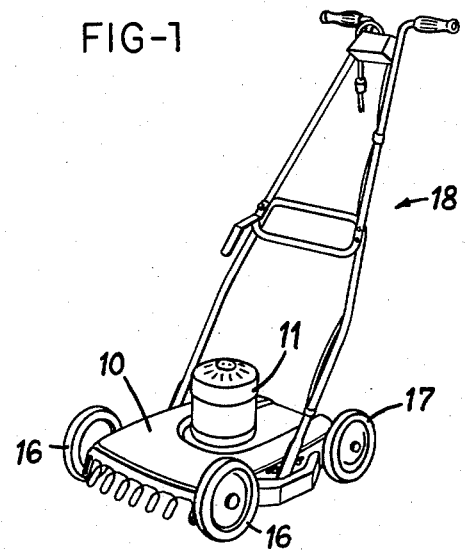
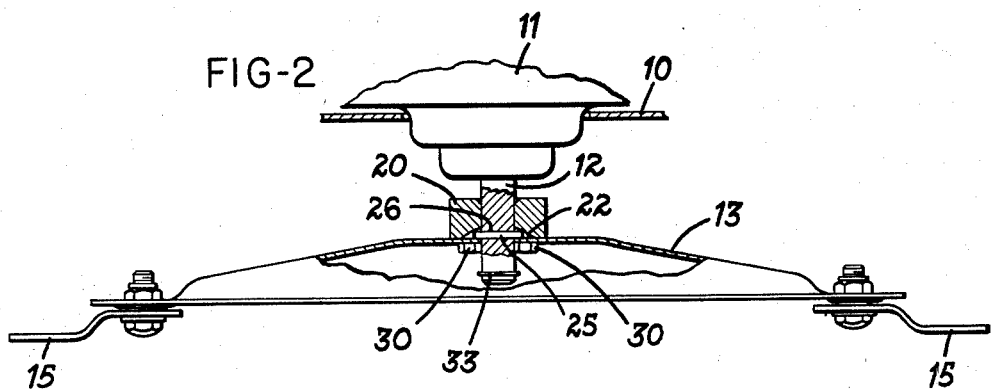
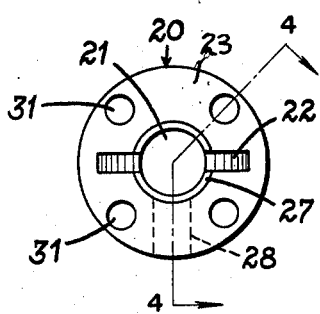
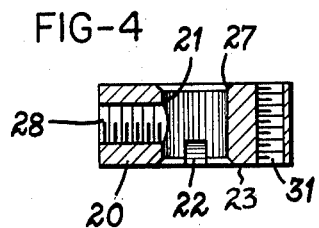
INVENTORS
FRANCIS R. McNEILL &
BY JOSEPH A. SILBEREIS
ATTORNEYS

United States Patent Office 2,793,484
Patented May 28, 1957

2,793,484

ROTARY DISC MOWER CUTTER MOUNTING MEANS

Francis R. McNeill, New Carlisle, and Joseph A. Silbereis, Dayton, Ohio, assignors to The Huffman Manufacturing Company, Dayton, Ohio, a corporation of Ohio Application March 9, 1954, Serial No. 415,042

6 Claims. (Cl. 56—25.4)

This invention relates to power lawn mowers.

The invention has special relation to rotary power lawn mowers wherein a cutting member such as a cutting disk or knife member is supported for rotation on a vertical axis in depending relation with a drive shaft and driving motor carried by the main body of the mower. In such a lawn mower, the cutting member develops substantial centrifugal force, and if it should become detached from its drive shaft during operation, it is capable of causing considerable damage to the turf or to the mower body, and possibly also to the operator. At the same time, since the cutting member in such mowers is usually substantially concealed beneath the main casing, it is possible for it to become loosened without notice by the operator. In addition, the cutting member must be kept sharpened for optimum operation, and it is therefore necessary that the connection thereof to the drive shaft be releasable to provide for removal of the cutting member for sharpening.

It is accordingly a primary object of the present invention to provide a hub unit for the cutting member of a rotary power lawn mower which is of simple and economical construction and which will give maximum assurance against accidental detachment of the cutting member from the drive shaft of the mower while at the same time permitting ready removal of the cutting member as required for sharpening or replacement.

It is a specific object of the invention to provide such a hub construction wherein the cutting member and its supporting hub member are secured against both angular and axial movement on the drive shaft by means of a removable key member which interfits with the shaft and the hub member and which is retained in its operating position with respect to the hub member by the cutting member itself in such manner that the cutting member can be removed from the shaft without the hub member but the unit as a whole cannot be removed from the shaft except by first detaching the cutting member from the hub member.

Additional objects and advantages of the invention will be apparent from the following description, the accompanying drawing and the appended claims.

In the drawing—

Fig. 1 is a view in perspective showing an electric rotary lawn mower constructed in accordance with the present invention;

Fig. 2 is an enlarged fragmentary section through the hub construction which supports the cutting member on the drive shaft of the mower of Fig. 1;

Fig. 3 is an enlarged detail view of the lower end of the hub member in the hub unit of Fig. 2; and Fig. 4 is a section on the line 4—4 of Fig. 3.

Referring to the drawing, which illustrates a preferred embodiment of the invention, the lawn mower includes a main body casing 10 formed of sheet metal on which is mounted a motor 11 having its axis arranged vertically so that its drive shaft 12 depends therefrom within the casing 10. The cutting member of this mower is shown as including a plate-shaped carrier disk 13 mounted on the drive shaft 12 for rotation on a vertical axis above the ground, and this carrier disk has a plurality of blades 15 mounted on its outer rim for cutting the grass as the disk rotates. The casing 10 is supported by a pair of front wheels 16 and a pair of rear wheels 17, and the guiding handle is indicated generally at 18.

The blade disk 13 is secured to the drive shaft 12 by means of a hub 20 having a central bore 21 of such diameter as to receive the shaft 12 rotatably therein. The lower end surface 23 of the hub 20 is provided with a slot 22 terminating within the outer periphery of the hub, this slot being readily formed by milling a pair of beveled slot portions along a diameter in such manner as to run out into the bore 21. This slot 22 cooperates with a pin 25 which is received within a diametral bore 26 in the drive shaft 12, and the pin 25 is substantially longer than the diameter of the shaft so that both ends project radially of the shaft as shown in Fig. 2.

With this construction, when the disk 13 is to be mounted on the shaft 12, the hub 20 is first slipped on the shaft with the pin 25 removed, and it will be noted that the upper end of the bore 21 is chamfered at 27 to facilitate this operation. After the hub has moved beyond the bore 26, the pin 25 is fitted into place, and the hub is then moved down the shaft until the ends of the pin seat properly within the slot 22 to limit further downward movement of the hub. If desired, the hub may be releasably set in this position by means of a suitable set screw in the tapped radial bore 28.

After the hub 20 is thus located and keyed to the shaft, the blade disk 13 is fitted on the shaft and is secured to the hub by means of four screws 30 in the complementary tapped bores 31 within the hub. The parts are so proportioned as shown that the disk 13 completely overlies the lower end of the hub to close the slot 22, and thus the blade disk cooperates with the pin 25 to prevent movement of the hub assembly in either direction axially of the shaft, and the pin at the same time positively keys the unit against angular movement with respect to the shaft.

It will accordingly be seen that this hub unit is simple to construct and to install, and that it offers positive assurance against loosening and resulting possible detachment of the cutting member from the shaft while at the same time making it a simple matter to remove the cutting member when desired for sharpening or replacement. Since accidental dropping of the cutting member would require loosening or breakage of all of the four screws 30, it will be seen that this is a remote contingency, but additional protection is offered against even that possibility by means of a split ring 33 carried in a suitable circumferential groove adjacent the lower end of the shaft 12. This ring is mounted in place following securing of the blade disk to the hub, and it is easily removed with a screw driver before the disk is unscrewed from the hub.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a power lawn mover including a main body having a motor mounted thereon with the drive shaft thereof substantially vertical to drive a rotary cutting member on a vertical axis, a hub construction for securing said cutting member in suspended driven relation with said shaft comprising a hub member, means interfitting with said shaft and said hub member in radially projecting relation with said shaft for directly securing said hub member against both angular movement and axial movement on said shaft below a predetermined axial position, and releasable means for securing said cutting member to said hub member with said cutting member cooperating with said interfitting means to prevent axial movement of said hub member above said predetermined position on said shaft.

2. In a power lawn mower including a main body having a motor mounted thereon with the drive shaft thereof substantially vertical to drive a rotary cutting member on a vertical axis, a hub construction for securing said cutting member in suspended driven relation with said shaft comprising a hub member located above said cutting member on said shaft, means received between said hub member and said cutting member and projecting radially outwardly of said shaft in angularly interlocked relation with said hub member and said shaft to secure said hub member against angular movement with respect to said shaft and axial movement on said shaft below a predetermined axial position, and releasable means for securing said cutting member to said hub member with said cutting member cooperating with said interfitting means to prevent axial movement of said hub member above said predetermined position on said shaft.

3. In a power lawn mover including a main body having a motor mounted thereon with the drive shaft thereof substantially vertical to drive a rotary cutting member supported on a vertical axis, a hub construction for securing said cutting member in suspended driven relation with said shaft comprising a hub member on said shaft having a slot in the lower end thereof terminating within the periphery thereof, means projecting radially from said shaft and interfitting within said slot to limit downward movement of said hub member on said shaft while keying said hub member to said shaft, and means for securing said cutting member to the lower end of said hub member in closing relation with said slot to retain said projecting means in said slot for coperation with said hub member and said cutting member to secure said cutting member against movement in either direction axially of said shaft.

4. In a power lawn mower including a main body having a motor mounted thereon with the drive shaft thereof substantially vertical to drive a rotary cutting member supported on a vertical axis, a hub construction for securing said cutting member in suspended driven relation with said shaft comprising a hub member having a through bore for freely receiving said shaft, said hub member having a slot in the lower end thereof extending along a diameter thereof and terminating at both ends within the outer circumference of said hub member, said shaft having a diametral bore, a pin receivable in said bore and of a greater length than the diameter of said shaft to project radially therefrom for interfitting within said slot in said hub member to key said hub member to said shaft, and releasable means for securing said cutting member to the lower end of said hub member in covering relation with said slot to retain said pin in said slot and to cooperate with said pin in securing said hub member against axial movement in either direction upon said shaft.

5. A hub construction for removably securing a cutting member for a lawn mover on a depending drive shaft, comprising a driving projection on said drive shaft, a hub member slidably mounted on said shaft above said projection, said hub member having a slot in the under surface thereof adapted to interfit in driven relation with said projection while limiting downward movement of said hub member on said shaft, said slot terminating within the periphery of said hub member to overhang the outer end of said projection and thereby to limit outward radial movement of said projection with respect to said shaft, and removable means positively securing said cutting member to the underside of said hub member with said cutting member covering the underside of said slot to prevent upward movement of said hub member out of driven engagement with said projection.

6. A hub construction for removably securing a cutting member for a lawn mover on a depending drive shaft, comprising a hub member slidably mounted on said shaft, a driving pin removably carried by said shaft and projecting outwardly therefrom to limit downward movement of said hub member, said hub member having a slot in the under surface thereof adapted to interfit in driven relation with said pin, said slot terminating within the periphery of said hub member to overhang the outer ends of said pin and thereby to prevent removal of said pin from said shaft, and removable means for positively securing said cutting member to the underside of said hub member with said cutting member covering the underside of said slot to prevent upward movement of said hub member out of driven engagement with said pin.

References Cited in the file of this patent
UNITED STATES PATENTS

| | | |
|---|---|---|
| 298,608 | Mohr | May 13, 1884 |
| 1,894,740 | Groenig et al. | Jan. 17, 1933 |
| 2,083,103 | Steiner | June 8, 1937 |
| 2,523,439 | May | Sept. 26, 1950 |
| 2,555,061 | Shields et al. | May 29, 1951 |